United States Patent [19]

Lehmann

[11] 4,090,618

[45] May 23, 1978

[54] DEVICE FOR INSERTING SPACING STRIPS BETWEEN BOARDS TO BE STACKED

[75] Inventor: Manfred Lehmann, Singen, Germany

[73] Assignee: Ludwig Bollmann KG, Rielasingen, Germany

[21] Appl. No.: 690,523

[22] Filed: May 27, 1976

[30] Foreign Application Priority Data

May 27, 1975 Germany .............................. 2523301

[51] Int. Cl.² ............................................. B65G 57/26
[52] U.S. Cl. .................................... 214/6 M; 198/484; 214/8.5 G; 221/218
[58] Field of Search .................. 214/6 M, 6 F, 8.5 G, 214/1 P; 198/480, 481, 723, 629, 484; 221/218

[56] References Cited

U.S. PATENT DOCUMENTS

| | | | |
|---|---|---|---|
| 3,387,720 | 6/1968 | Wilkin | 214/6 M |
| 3,388,784 | 6/1968 | Gartner | 198/629 |
| 3,575,279 | 4/1971 | Buchheit | 214/8.5 K |
| 3,738,510 | 6/1973 | Mason | 214/6 M |
| 3,823,834 | 7/1974 | Rysti | 214/6 M |

Primary Examiner—Drayton E. Hoffman
Assistant Examiner—Ross Weaver
Attorney, Agent, or Firm—Karl F. Ross

[57] ABSTRACT

In order to separate boards of wood or the like from one another in a stack, spacing strips are successively lifted from a hopper by a rising flight conveyor and are accumulated on a generally horizontal extension of that conveyor for consecutive pickup, at predetermined instants of an operating cycle of a stacker, by a transfer mechanism delivering each strip to a passing gripper on a continuously moving transport band overlying the stack. A vertically movable frame beneath the transport band, positioned above a stacking platform, carries a series of unloaders normally projecting into the path of the oncoming strips for dislodging them from their grippers and depositing them on a board already resting on the platform as part of a growing stack. The unloaders can be selectively deactivated to vary the number and/or the spacing of the strips deposited on the top of the stack.

20 Claims, 3 Drawing Figures

DEVICE FOR INSERTING SPACING STRIPS BETWEEN BOARDS TO BE STACKED

FIELD OF THE INVENTION

My present invention relates to a device for inserting spacing strips between boards of wood or other material to be stacked with formation of air-circulation clearances between the several layers of the stack.

BACKGROUND OF THE INVENTION

For the drying of freshly cut wood, for example, automatic or semiautomatic stackers are known which pile individual boards or groups of boards in successive layers on a supporting platform. Generally, in such a system, the platform is vertically movable and can descend stepwise in order to keep the top of the growing stack at a certain level. In order to expedite the seasoning of the wood, spacing strips are inserted between successive layers in a number and with a relative separation depending on the length and thickness of the boards as well as on the type of wood involved. Drying air can be circulated by blowers through the clearances thus formed in the stack.

Heretofore, the spacing strips had to be manually deposited on the uppermost board or boards of a stack before the addition of the next layer. A certain degree of automation in the strip-laying process can be achieved, according to an earlier proposal (see, for example, German published specification No. 2,259,394), by the provision of several magazines which can be filled with the necessary number of spacing strips and from which these strips can then be sequentially discharged at the proper locations along the stack. Such a system, however, still requires considerable manual work inasmuch as each of the magazines must be individually loaded before the beginning of the stacking operation.

OBJECTS OF THE INVENTION

The general object of my present invention is to provide a device for automatically distributing such spacing strips in a preselected pattern on boards successively deposited on a vertically movable platform to form a stack.

A more particular object is to provide means in such a device for enabling the number and the distribution of the spacing strips between any two consecutive boards of the stack to be conveniently changed.

SUMMARY OF THE INVENTION

A device according to my invention, designed to insert spacing strips between boards successively delivered to a vertically movable platform by a stacker, comprises storage means for accumulating a plurality of such strips supplied thereto by input means such as a lifting conveyor. A transfer mechanism periodically moves the accumulating spacing strips from the storage means to a transporter delivering these strips to an area above the stacking platform for deposition on the boards already piled thereon, i.e. on the uppermost board or group of boards of the growing stack. The operations of the transfer mechanism and the transporter are timed by a programmer which correlates them with the operating cycles of the stacker in order to insure that the correct number of spacing strips are deposited between intermittent descents of the stacking platform.

The storage means may comprise a generally horizontal, preferably downwardly sloping extension of the lifting conveyor, the lower end of that lifting conveyor being bracketed by a cradle with upwardly diverging cheeks serving to guide a supply of spacing bars to a rising side of that conveyor. Advantageously, pursuant to a further feature of my invention, the cradle is provided with a carriage on a sloping surface so that one of its cheeks is urged by gravity toward the rising conveyor side, thereby forming with that side a trough which progressively contracts as successive strips are being lifted out of that cradle. The lifting conveyor may comprise a pair of first chains bridged by a set of flights for positive upward entrainment of the strips; its generally horizontal extension, acting as the storage means, may comprise a pair of second chains bracketing the chains of the lifting conveyor but having no flights in order to facilitate the temporary arresting of a leading spacing strip by a detent which prevents the transfer of the next series of strips to the transporter and thence to the stacking area during a predetermined phase of a cycle, i.e. until a newly emplaced board is ready to receive these strips.

Pursuant to another feature of my invention, the transfer mechanism includes a pair of lugs coupled for joint rotation about longitudinal axes, i.e. axes parallel to the direction of movement of the spacing strips on the conveyor extension, for raising opposite ends of a strip off that extension toward the underside of a drum which is rotatable about a transverse axis. The drum is provided with entrainment means, such as two parallel cleats, for lifting a spacing strip off the two lugs into the path of the transporter. The latter may comprise an endless band with substantially horizontal upper and lower runs which overlies the drum and extends toward the stacking area, the band being provided with a set of grippers engaging the spacing strips that have been entrained to substantially the top of the drum. A stationary guide member spaced from the drum periphery may form a channel for the strips which opens to the top of the drum.

The transporter, pursuant to a further feature of my invention, coacts with unloading means at the stacking area for disengaging oncoming strips from the grippers preparatorily to depositing these strips on the uppermost board or boards. The unloading means can be constituted by a series of rocker-shaped unloaders which are spaced apart in the direction of band movement and which serve for the successive releasing of the strips at predetermined locations onto the top of the stack. The unloading rockers advantageously have a receiving end which is biased, preferably by a counterweight, into a raised position in the absence of an engaged spacing strip and is depressed by such a strip into a lowered position out of the path of further spacing strips carried by the grippers. With the aid of selectively operable stop means, serving to hold the receiving end of a given rocker in its lowered position, individual unloaders may be deactivated so as to limit the number of locations on which spacing strips can be deposited. With a large number of such unloaders disposed close to one another, their selective deactivation affords a wide choice in the distribution of spacing strips within a stack.

BRIEF DESCRIPTION OF THE DRAWING

The above and other features of my invention will now be described in detail with reference to the accompanying drawing in which.

SPECIFIC DESCRIPTION

Figure 1:
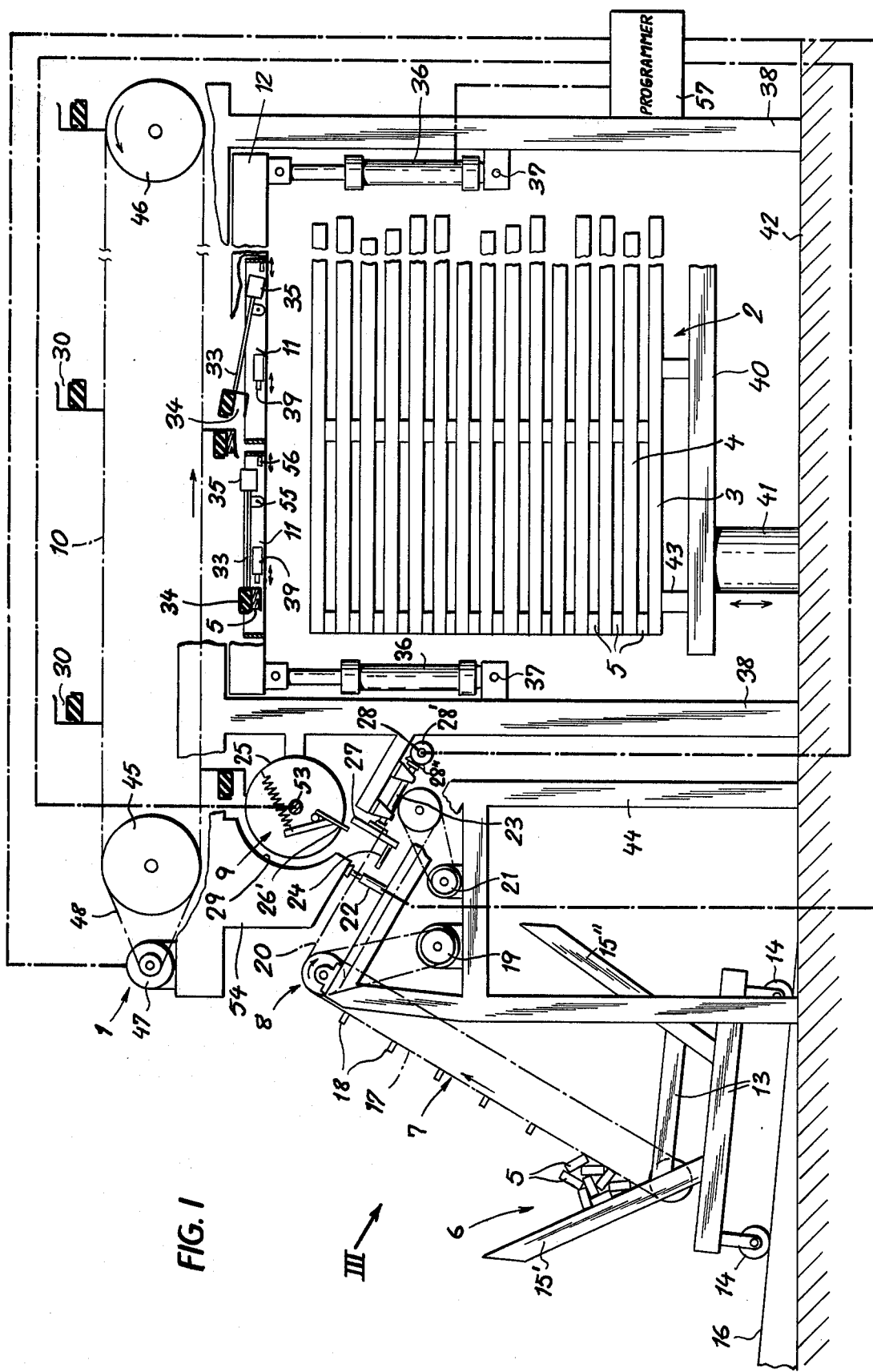
FIG. 1 is a somewhat diagrammatic side-elevational view of a strip-inserting device according to my invention.

The device shown in the drawing, generally designated 1, is designed to co-operate with a conventional board stacker which may also include means for the packaging of a completed stack and of which only a vertically movable stacking platform 40 has been illustrated, that platform being supported by several pistons 41 (only one shown) of hydraulic cylinders sunk in a foundation 42. A multiplicity of boards 3, 4 to be seasoned, the lowermost one of which rests on blocks 43, are successively piled on the platform 40 to form a stack 2. The stacked boards are separated by respective series of spacing strips 5 interposed in several columns of which only two have been illustrated. Platform 40 is elevatable to almost the top of a surrounding structure 38 which forms a support for an overhead transporter in the form of an endless band 10 with horizontal upper and lower runs, this band consisting of two parallel chains engaged by sprockets 45, 46 and driven by a motor 47 via a further chain 48. A horizontal frame 12 is mounted on supporting structure 38, just below the lower run of transporter 10, through the intermediary of a pair of hydraulic jacks 36 which are pivoted at 37 to the uprights of support 38.

Figure 3:
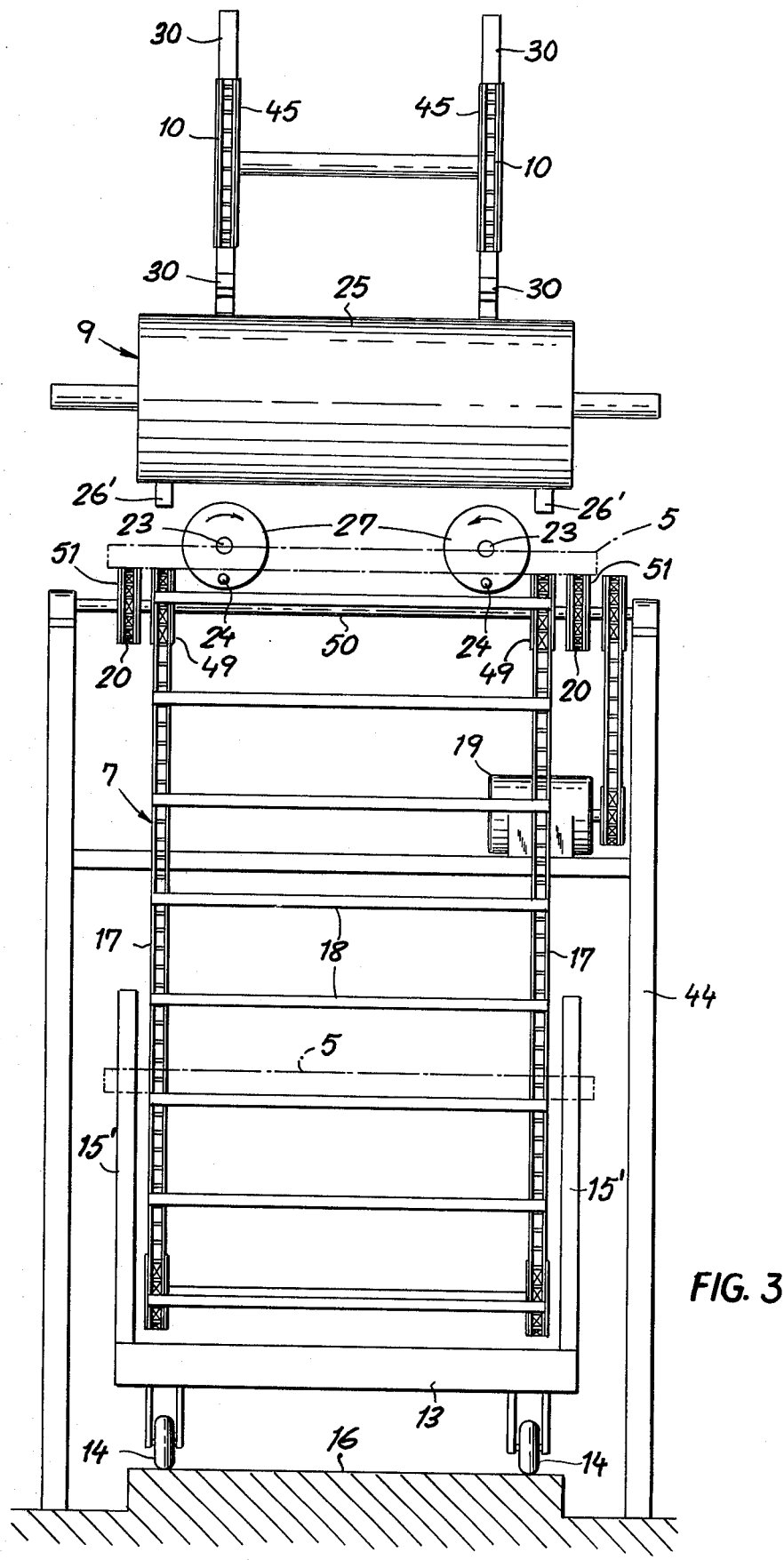
FIG. 3 is a front view as seen in the direction of arrow III in FIG. 1.

Another support 44 serves as a mounting for a rising flight conveyor 7 dipping into a cradle 6 which is initially filled with a supply of spacing strips 5. Cradle 6 has a pair of upwardly diverging cheeks 15' and 15", the front cheek 15' defining a trough with the forward surface of conveyor 7 whose angle of inclination to the horizontal substantially equals that of the rear cheek 15" of the cradle. Each of the two cheeks consists of a pair of arms rising from a carriage 13, the transverse spacing of these arms being slightly greater than the width of the conveyor 7 as seen in FIG. 3. As further shown in this Figure, conveyor 7 comprises two parallel chains 17 bridged by flights 18 which enter between the arms 15' forming the front cheek of the cradle. Carriage 13 rolls on a sloping surface 16 so that the V-shaped trough defined by cheek 15' and the front face of conveyor 7 progressively shrinks as the carriage moves with its own weight toward the right (as viewed in FIG. 1) with the depletion of its supply of strips 5. A drive motor for an upper pair of chain-engaging sprockets 49 of this conveyor has been illustrated at 19.

Sprockets 49 are mounted on a shaft 50 also carrying a pair of idler sprockets 51 embraced by two chains 20 that form part of a generally horizontal conveyor 8, this conveyor also including a pair of sprockets on a shaft 52 driven by a motor 21. The use of two separate motors 19 and 21 enables the two conveyors 7 and 8 to be operated at different speeds, e.g. intermittently in the case of the former and continuously in the case of the latter. Conveyor 8 serves for the temporary storage of a number of spacing strips 5 sufficient to occupy all locations assigned to such strips at any level of the stack; thus, a switch for the operation of motor 19 may be closed (by an operator or by an automatic sensor) whenever less than the requisite number of strips are accumulated on extension conveyor 8. It will be noted that this latter conveyor does not have any flights whereby the accumulating strips 5 can be arrested by detent means 22 in the form of a pair of solenoid-operating plungers (only one shown) coacting with a fixed guide member 54 which forms part of the supporting structure 38.

Figure 2:
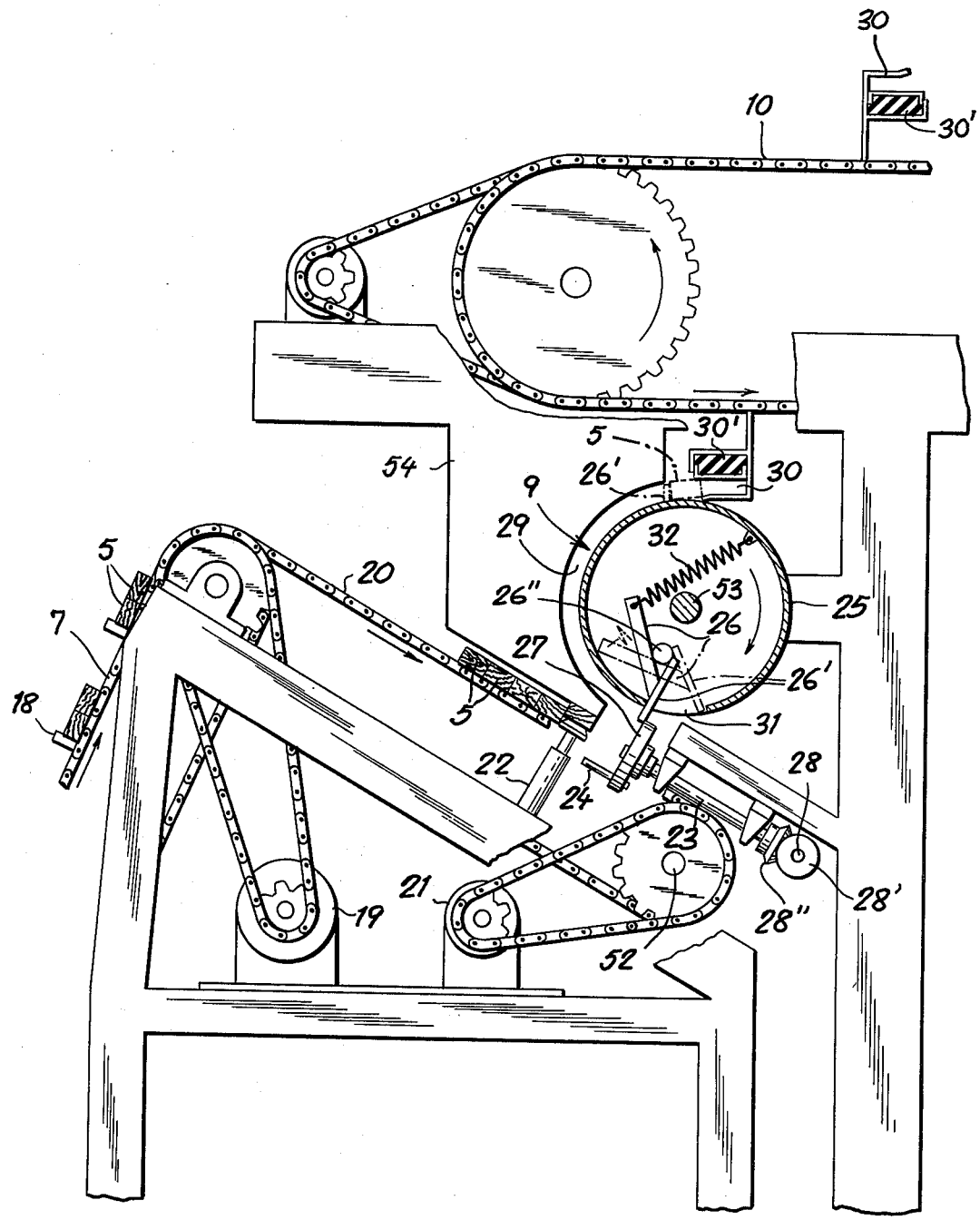
FIG. 2 is a view similar to FIG. 1, showing certain elements of the device drawn to a larger scale.

A transfer mechanism 9 comprises a shaft 28 with two bevel gears 28' engaging coacting bevel gears 28" on two shafts 23 which extend parallel to the direction of movement of the chains 20. Shafts 23 support, between these chains, a pair of counterrotating disks 27 carrying eccentric lugs 24 which reach beneath the upper runs of the chains and pick up an approaching spacing strip 5 upon the deactivation of the detents 22. The lugs 24, orbiting in synchronized fashion about the axes of shafts 23, raise the engaged strip 5 toward the underside of a drum 25 with a horizontal shaft 53 extending transversely to the conveyor chains above the disk shafts 23. Shafts 28 and 53 may be driven by the motor 47. Drum 25, whose construction is more clearly illustrated in FIG. 2, has a pair of peripheral slots 31 through which the tips or cleats 26' of a pair of levers 26 project outwardly, these levers being fulcrumed on eccentric studs 26" and being biased by tension springs 32 so as normally to rest against the front ends of their slots.

Guide member 54, which may comprise two axially separated parallel plates, forms with the periphery of drum 25 a generally semiannular channel 29 in which a strip 5 engaged by the cleats 26 can be moved upwardly to the top of the drum. Springs 32 are strong enough to resist rearward displacement of the cleats by the weight of the engaged strip; they yield, however, when a stronger reaction force opposes further displacement of the strips at the peripheral drum speed. Such a reaction force comes into existence when the strips, on leaving the channel 29, are deposited in clips 30 depending from the lower run of the transport conveyor 10, the linear speed of these clips being less than the peripheral drum speed to let cleats push the entrained strip 5 into the rearwardly open jaws of a pair of passing clips 30. A firm gripping of the spacing strips 5 by the clips 30 is assured, even if the strips vary in thickness or depart from straight linearity, by providing each clip with a resilient cushion 30' bearing elastically on the engaged strip. As the slots 31 of the drum pass underneath the slow-moving grippers or clips 30, the cleats 26 are repressed against the force of springs 32 toward the rear ends of these slots whereby their tips 26' are retracted into the interior of drum 25, as illustrated in dot-dash lines in FIG. 2. The retracted cleats, therefore, clear the overhanging clips 30 on their way to the nadir of the drum where they may pick up the next spacing strip in the series moving past the deactivated detents 22. The drives of the transfer mechanism 9 and the transporter 10 are advantageously so correlated that the drum 25 performs a whole number of revolutions between passes of successive grippers 30 across its zenith; naturally, disks 27 should turn at such a rate that only one spacing strip 5 is raised into the path of cleats 26 on the approach of each clip pair.

The clips 30 gripping the strips 5 move across the hydraulically controlled frame 12 which carries a plurality of unloaders 11 defining respective strip-deposition locations along the stack 2. Each unloader 11 comprises a pivotal mounting for two parallel rockers 33 (only one shown) with a common fulcrum 55, each rocker having a bifurcate receiving end 34 which is similar to the jaws of clips 30. The opposite rocker end is biased downwardly by a weight 35 so dimensioned that the unloaded rocker is swung into an inclined position as illustrated on the right in FIG. 1, the receiving ends 34 of an unloaded rocker pair being then elevated into the path level of travel of the clips 30 which are laterally offset therefrom. A strip 5 carried by the oncoming clips is thus deposited in the jaws of the rockers which, under the added weight, swing downwardly into a substantially horizontal position as illustrated at left in FIG. 1. It will be noted that, in this position, a strip 5 carried by another clip pair can pass unhindered over the respective unloader 11.

Any unloader can be selectively immobilized with the aid of a stop 56 which can be slid under the counterweights 35 of its two rockers to hold them in their lowered position in which they cannot receive any spacing strip from transporter 10. The selected stops 56 can be shifted manually before the stacker is placed in operation.

When all the active unloaders 33 have received respective spacing strips from the transporter 10, the frame 12 is lowered by the jacks 36 onto the top of the stack 2 whereupon a set of ejectors, here shown as solenoids 39, are actuated to dislodge the strips 5 from the receiving jaws 34 of rockers 33 and to deposit these strips in their proper positions on the uppermost board or boards of the stack. This dislodgment will allow the rockers to return to their inclined positions in which they are ready, after re-elevation of the frame 12 into its illustrated normal position, to engage a new set of spacing strips to be brought on by the grippers 30. The cycle can then be repeated.

A programmer 57, indicated diagrammatically in FIG. 1, serves to time the operations of lifters 24, drum 25, transporter 10, jacks 36 and ejectors 39 in the above described manner to correlate them with the operating cycles of the stacker and with the intermittent descent of the platform 40.

Microsensitive switches or other sensors may be used to monitor the operation of the unloaders 11 and to prevent the lowering of frame 12 while also halting the feeding of fresh boards to the stack until all the rockers 33 are swung into their horizontal positions.

Obviously, any change in the number of spacing strips to be inserted at a given level of a stack will also require a modification of the timing of the operation of detents 22 by the programmer to insure that the requisite number of accumulated strips are fed to the lifting lugs 24 during each active phase.

I claim:

1. In a board-stacking apparatus including a vertically movable platform on which boards are successively piled to form a stack, with the uppermost board held at a given level by an intermittent descent of said platform between stacking cycles, the combination therewith of a device for inserting spacing strips between said boards during the formation of said stack, said device comprising:

storage means for accumulating a plurality of spacing strips to be inserted between boards of the stack;
   input means including a lifting conveyor for supplying successive spacing strips to said storage means;
   transport means for delivering spacing strips from said storage means to an area above said platform for deposition on boards piled thereon;
   transfer means for periodically removing accumulated spacing strips from said storage means to said transport means; and
   timing means for correlating the operation of said transfer and transport means with said stacking cycles;
   said input means further comprising a cradle with upwardly diverging cheeks bracketing the lower end of said lifting conveyor for guiding a supply of spacing bars thereto, said cradle being provided with a carriage riding on a sloping surface, said cheeks being mounted on said carriage for movement of one of said cheeks by gravity toward a rising side of said lifting conveyor with progressive contraction of a trough formed between said rising side and said one of said cheeks.

2. In a board-stacking apparatus including a vertically movable platform on which boards are successively piled to form a stack, with the uppermost board held at a given level by an intermittent descent of said platform between stacking cycles, the combination therewith of a device for inserting spacing strips between said boards during the formation of said stack, said device comprising:

a lifting conveyor provided with a generally horizontal extension for accumulating a plurality of spacing strips to be inserted between boards of the stack;
   transport means for delivering spacing strips from said extension to an area above said platform for deposition on boards piled thereon;
   transfer means for periodically removing accumulated spacing strips from said storage means to said transport means; and
   timing means for correlating the operation of said transfer and transport means with said stacking cycles;
   said transfer means comprising a pair of lugs coupled for joint rotation about longitudinal axes substantially paralleling the direction of strip movement on said extension for raising opposite ends of a spacing strip off said extension, a drum rotatable about a transverse axis above said longitudinal axes, and entrainment means for lifting a spacing strip off said lugs into the path of said transport means, said entrainment means including two parallel cleats pivotable about fulcra within said drum, said cleats projecting from peripheral slots of the drum and being provided with spring means urging said cleats toward leading ends of said slots, said cleats being retractable into said drum by an overriding reaction force from said transport means moving said cleats away from said leading ends.

3. In a board-stacking apparatus including a vertically movable platform on which boards are successively piled to form a stack, with the uppermost board held at a given level by an intermittent descent of said platform between stacking cycles, the combination therewith of a device for inserting spacing strips between said boards during the formation of said stack, said device comprising:

a lifting conveyor including a pair of first chains bridged by a set of flights;
   a storage conveyor forming a generally horizontal extension of said lifting conveyor for accumulating a plurality of spacing strips taken over from said lifting conveyor for insertion between boards of the stack, said storage conveyor including a pair of flightless second chains bracketing said first chains;

transport means for delivering spacing strips from said storage conveyor to an area above said platform for deposition on boards piled thereon;

transfer means for periodically removing accumulated spacing strips from said storage means to said transport means, said transfer means including a pair of lugs coupled for synchronized orbiting in opposite directions about longitudinal axes between and parallel to said second chains for raising opposite ends of a spacing strip off said storage conveyor;

timing means for correlating the operation of said transfer and transport means with said stacking cycles; and detent means upstream of said transfer means controlled by said timing means and engageable with a leading spacing strip on said storage conveyor during a predetermined phase of a stacking cycle.

4. The combination defined in claim 3 wherein said transfer means further comprises a drum rotatable about a transverse axis above said longitudinal axes, said drum being provided with entrainment means for lifting a spacing strip off said lugs into the path of said transport means.

5. The combination defined in claim 4 wherein said entrainment means comprises two parallel cleats pivotable about fulcra within said drum, said cleats projecting from peripheral slots of the drum and being provided with spring means urging said cleats toward leading ends of said slots, said cleats being retractable into said drum by an overriding reaction force from said transport means moving said cleats away from said leading ends.

6. The combination defined in claim 4 wherein said transport means comprises an endless band with a substantially horizontal lower run overlying said drum and extending toward said area, said band being provided with gripper means engageable with said spacing strips upon entrainment thereof to substantially the top of said drum.

7. The combination defined in claim 6 wherein said gripper means comprises a set of longitudinally equispaced pairs of clips hanging down from said lower run while moving across said drum.

8. The combination defined in claim 7 wherein said clips form resilient jaws open toward the rear and moving at a speed less than the peripheral speed of said drum.

9. The combination defined in claim 4 wherein said transfer means further comprises a stationary guide member spaced from the periphery of said drum and forming therewith a channel for said spacing strips opening onto the top of the drum.

10. The combination defined in claim 6, further comprising unloading means at said area for disengaging oncoming spacing strips from said gripper means preparatorily to depositing the strips on the uppermost board of the stack.

11. The combination defined in claim 10 wherein said unloading means comprises a series of unloaders spaced apart in the direction of movement of said band for engaging successive spacing strips to be released at predetermined locations onto the uppermost board.

12. The combination defined in claim 11 wherein each of said unloaders comprises at least one rocker with a receiving end facing the oncoming spacing strips, said receiving end being biased into a raised position in the absence of a spacing strip engaged thereby and being depressible by an engaged spacing strip into a lowered position out of the path of further spacing strips carried by said gripper means.

13. The combination defined in claim 12 wherein said rocker is provided with stop means for selectively deactivating it with maintenance of said receiving end in said lowered position.

14. The combination defined in claim 11 wherein said unloaders are provided with a common frame lowerable toward the uppermost board of an underlying stack by said timing means prior to release of an engaged spacing strip from any of said unloaders.

15. The combination defined in claim 14 wherein said frame is provided with ejection means for dislodging the engaged spacing strips from said unloaders.

16. In a board-stacking apparatus including a vertically movable platform on which boards are successively piled to form a stack, with the uppermost board held at a given level by an intermittent descent of said platform between stacking cycles, the combination therewith of a device for inserting spacing strips between said boards during the formation of said stack, said device comprising:

storage means for accumulating a plurality of spacing strips to be inserted between boards of the stack;

input means for supplying successive spacing strips to said storage means;

transport means for delivering spacing strips from said storage means to an area above said platform for deposition on boards piled thereon, said transport means including an endless band with a substantially horizontal lower run overlying said area, said band being provided with grippers hanging down from said lower run while moving across said area;

transfer means for periodically removing accumulated spacing strips from said storage means to said transport means for entrainment by said grippers;

timing means for correlating the operation of said transfer and transport means with said stacking cycles; and a series of mutually independent unloaders disposed underneath said lower run for disengaging entrained spacing strips from respective grippers passing over certain portions of said area, each of said unloaders being individually elevatable into a raised position at the level of said grippers for releasing an entrained spacing strip and being individually retractable into a lowered position beneath said level for giving unhindered passage to entrained spacing strips destined for release by other unloaders, each of said unloaders including at least one rocker with a receiving end facing the oncoming spacing strips, said receiving end being biased into said raised position in the absence of a spacing strip engaged thereby and being depressible by an engaged spacing strip into said lowered position out of the path of further spacing strips carried by said grippers.

17. The combination defined in claim 16 wherein each of said grippers comprises a pair of clips with resilient rearwardly open jaws.

18. The combination defined in claim 16 wherein said rocker is provided with stop means for selectively deactivating it with maintenance of said receiving end in said lowered position.

19. In a board-stacking apparatus including a vertically movable platform on which boards are successively piled to form a stack, with the uppermost board held at a given level by an intermittent descent of said platform between stacking cycles, the combination therewith of a device for inserting spacing strips between said boards during the formation of said stack, said device comprising:

storage means for accumulating a plurality of spacing strips to be inserted between boards of the stack;

input means for supplying successive spacing strips to said storage means;

transport means for delivering spacing strips from said storage means to an area above said platform for deposition on boards piled thereon, said transport means including an endless band with a substantially horizontal lower run overlying said area, said band being provided with grippers hanging down from said lower run while moving across said area;

transfer means for periodically removing accumulated spacing strips from said storage means to said transport means for entrainment by said grippers;

timing means for correlating the operation of said transfer and transport means with said stacking cycles;

a series of mutually independent unloaders disposed underneath said lower run provided with strip-engaging bifurcations for disengaging entrained spacing strips from respective grippers passing over certain portions of said area, each of said unloaders being individually elevatable into a raised position at the level of said grippers for releasing an entrained spacing strip and being individually retractable into a lowered position beneath said level for giving unhindered passage to entrained spacing strips destined for release by other unloaders; and a series of ejectors each individual to a respective unloader for dislodging an engaged strip from the bifurcation of the associated unloader in said lowered position thereof.

20. The combination defined in claim 19 wherein said unloaders are movably maintained on a common frame lowerable toward the uppermost board of an underlying stack by said timing means prior to release of an engaged spacing strip from any of said bifurcations, said ejectors being horizontally movable on said frame.

* * * * *